May 5, 1942.　　A. S. VINCENT　　2,281,608
VIEWING DEVICE FOR COOKING RANGES
Original Filed July 15, 1938
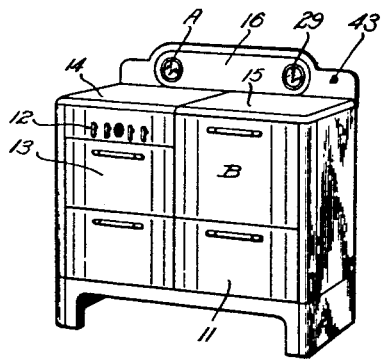
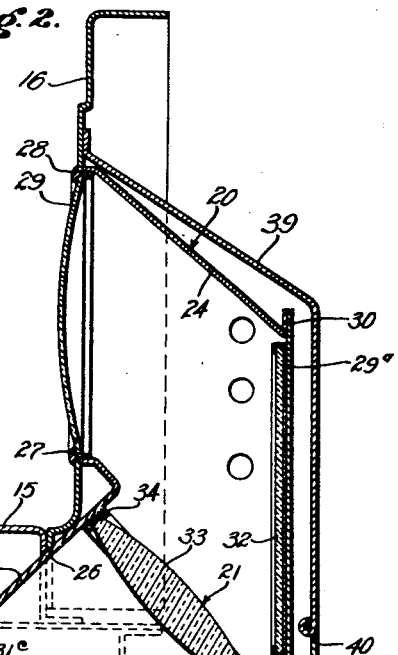
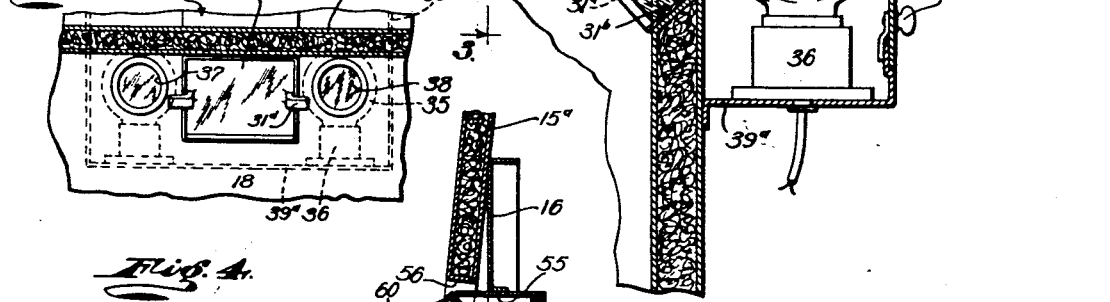
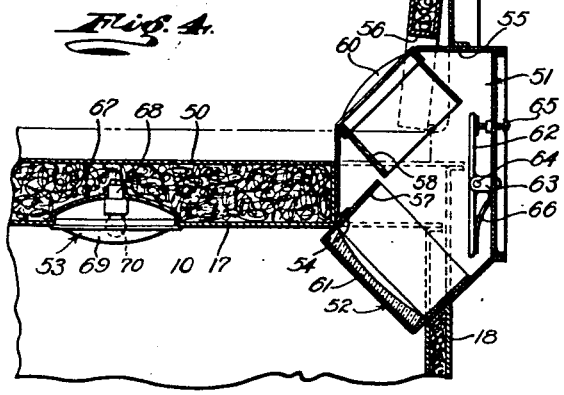
Inventor
ALFRED S. VINCENT
By
His Attorney Patented May 5, 1942

2,281,608

UNITED STATES PATENT OFFICE 2,281,608

VIEWING DEVICE FOR COOKING RANGES

Alfred S. Vincent, Los Angeles, Calif.

Application July 15, 1938, Serial No. 219,415
Renewed February 26, 1940

7 Claims. (Cl. 88—72)

This invention relates to cooking ranges and relates more particularly to means for facilitating the viewing of articles in the oven of a cooking range.

Console cooking ranges have become very popular and have practically entirely replaced the high oven ranges in the domestic field. Console ranges are characterized by the low oven whose top is usually flush with the top burners. While possessing many advantages console ranges have certain undesirable features from a utilitarian standpoint. Probably the most serious of these disadvantages is the difficulty encountered in viewing and handling the vessels or pans in the oven when the same is in use. It is necessary to assume a stooping or bending position in order to look in the oven of a console range and when in this awkward position the heat from the open oven doorway rushes from the oven into the face of the cook. In the cooking of certain foods it is necessary to view the food articles from time to time as the cooking progresses and the cook must open the oven door each time and stoop or bend over to look in the oven. Each of these operations is accompanied by a substantial loss of heat, with possible deleterious effects on the food, and the discharge of the heated air, smoke and cooking odors into the room.

A general object of this invention is to provide a cooking range of the console type embodying means for viewing the interior of the oven and the articles therein without bending or stooping and, if desired, without opening the oven door, thereby overcoming or avoiding the undesirable features of console ranges referred to above.

Another object of this invention is to provide a viewing means for embodiment in a cooking range of the console type for directing a clear image of the interior of the oven to a convenient point of view at the exterior of the range whereby the condition of the foodstuffs being cooked is readily apparent at all times.

Another object of this invention is to provide a cooking range construction of the character mentioned having means for illuminating the interior of the oven compartment so that the foodstuffs therein may be readily examined by means of the viewing means mentioned above, without opening the oven door, and, therefore, without heat loss, without endangering the foodstuff, and without the discharge of cooking odors into the kitchen.

Another object of the invention is to provide a viewing means for embodiment in a cooking range that provides for the viewing of the rear portions of the articles in the range without removing them from the oven, and without turning them around, and without opening the oven door.

Another object of this invention is to provide a viewing device in which the image of the interior of the oven is seen at the rear guard rail of the range by means of an optical system so constructed and located that it does not interfere with the normal use of the range or the operation of any of the range parts.

Another object of this invention is to provide a range construction of the character mentioned in which the means for viewing the interior of the range is simple and inexpensive, entirely concealed and easily incorporated in the range structure.

Another object of this invention is to provide an appliance or attachment for a cooking range that is capable of illuminating the interior of the oven and that permits the viewing of the interior of the oven and the articles therein while thus illuminated and without opening the oven door.

A further object of this invention is to provide an appliance or attachment of the character mentioned that is in the nature of a single, compact unit readily embodied in or applied to a range of the console type.

The various objects and features of my invention will be fully understood from the following detailed description of typical preferred forms and applications of the invention, throughout which description reference is made to the accompanying drawing, in which:

Fig. 1 is a front perspective view of a typical console range embodying one form of viewing means of the invention. Fig. 2 is an enlarged fragmentary vertical detailed sectional view of the range and the viewing means. Fig. 3 is a fragmentary, slightly reduced vertical detailed sectional view taken as indicated by line 3—3 on Fig. 2 and Fig. 4 is a fragmentary vertical detailed sectional view illustrating another form of the invention embodied in a cooking range.

While the present invention is intended primarily for embodiment in cooking ranges of the console type it is to be understood that it is capable of embodiment in or application to both gas and electric cooking ranges of various types, designs and styles. In the following detailed description I will describe two typical forms of the invention embodied in a more or less conventional range of the console type, it being understood that the invention is not to be construed as limited or restricted to the specific details about to be described, but is to be taken as including any features or modifications that may fall within the scope of the claims.

The typical cooking range illustrated in the drawing is provided with the usual oven compartment 10, a broiler 11 below the oven, valves 12 for controlling the top burners (not shown) and the usual compartments 13 below the top burners. The top burners (not shown) are covered by a hinged top 14. The cover 15 extending over the oven may be considered as fixed. A substantially vertical rear guard rail 16 extends along the top of the range. As illustrated in Fig. 2 of the drawing, the oven compartment 10 has a top wall 17 and a back wall 18. The walls 17 and 18 and the other walls of the compartment 10 are provided with suitable thermal insulation 19.

The viewing means or device of the present invention illustrated in Figs. 1, 2 and 3 may be said to comprise, generally, a light transmitting tube 20 having one end receiving light images from the oven compartment 10 and having one end visible at the face of the guard rail 16, an optical system 21 in the tube 20 and means 22 for illuminating the oven compartment 10 to be viewed through the tube 20 with the aid of the optical system 21.

The tube 20 is in the nature of a light conducting structure or member. The tube 20 is formed and arranged to have its lower end receive the light or images from the oven compartment 10 and to have its upper end open to view at the forward face of the guard rail 16. In the construction illustrated the tube 20 has the shape of an L or elbow embodying angularly related upper and lower arms 23 and 24. The lower arm 23 of the tube 20 slopes downwardly and inwardly toward the center of the oven compartment 10 and its lower portion is received in an opening 25 in the oven wall. The opening 25 is at the line of joinder of the top and back walls 17 and 18 of the oven compartment 10 and the tube arm 23, received in the opening 25, projects into the compartment at its upper rear corner. The arm 23 is suitably fixed or secured in the opening 25. In accordance with the invention the arm 23 projects upwardly and rearwardly beyond the rear side of the guard rail 16. A hidden or concealed portion of the rail 16 may be cut away at 26 to receive or pass the tube arm 23.

The upper arm 24 of the L-shaped tube 20 slopes upwardly and forwardly. An opening 27 is provided in the back rail 16 at the upper end of the arm 24. A ring or sleeve 28 is arranged in the opening 27 and carries a suitable transparent window or viewing lens 29. The back or rear portion of the tube 20 is closed by a substantially vertical plate 29ᵃ welded or otherwise fixed to a flange 30 on the tube 20. If desired, the tube arms 23 and 24 may be tapered. As illustrated in the drawing, the lower tube arm 23 flares upwardly and rearwardly and the upper arm 24 flares downwardly and rearwardly.

It is preferred, although not necessary, to locate the tube 20 in the central vertical plane of the oven compartment 10 so that the viewing lens 29 will be centrally located above the oven. A mirror, oven control, clock or similar device designated A in Fig. 1, may be provided on the rail 16 to complement or balance the viewing lens 29. It is to be observed that the light transmitting tube 20 constructed and arranged as just described is entirely concealed from the front of the range and may be embodied in the range construction with a minimum of alteration and expense.

The optical system 21 is in the nature of a lens and reflector system for projecting the image of the oven compartment 10 and its contents to the outer end of the tube 20 to be viewed at or through the viewing lens 29. The optical system 21 includes a concave or divergent lens 31 at the inner end of the tube 20. The divergent lens 31 acts as a condensing lens and is arranged with its plain face or side facing inwardly toward the interior of the oven compartment 10 and its concave side facing outwardly. While the lens 31 may be of any selected external or peripheral shape it will herein be considered that the lens 31 is rectangular or square and that the lower portion of the tube arm 23 is correspondingly shaped to receive the lens. The lens 31 is carried in the lower portion of the tube arm 23 and suitable means is provided to removably retain the lens 31 in the tube arm 23. In the construction illustrated a groove 31ᵃ is formed in the edge of the lens 31 and inwardly projecting detents 31ᵇ are provided on the interior of the tube arm 23 to cooperate with the groove. An inwardly projecting ridge 31ᶜ is provided on the tube arm 23 to limit the inward movement of the lens 31. Suitable handles 31ᵈ are provided on the edge of the lens 31. When the lens 31 is inserted in the lower end of the tube arm 23 the detents 31ᵇ snap into the grooves 31ᵃ to hold the lens in place. The divergent lens 31 arranged as just described is readily accessible from the oven compartment 10 for removal. It will be observed that the lens 31 closes the inner or lower end of the tube 20 to prevent the excessive loss of heat from the oven compartment 10 through the tube. The concave lens 31 serves to receive light from substantially the entire oven compartment 10 and condenses or diminishes the light images for passage outwardly through the tube 20.

The optical system 21 further includes a reflector 32 arranged in the tube 20 at the juncture of its arms 23 and 24 to reflect the light or light images transmitted by the lens 31 outwardly through the tube arm 24. The reflector 32 is arranged on the forward face of the plate 29ᵃ. The reflector 32 may be in the nature of the silvered glass mirror as illustrated, or may be formed of polished or plated metal. The plane of the reflector 32 is at the correct angle to the longitudinal axes of the tube arms 23 and 24 to reflect the light from the oven compartment 10 outwardly through the tube arm 24 and the viewing lens 29.

The optical system 21 may further include a convex lens 33 arranged between the lens 31 and the reflector 32. The lens 33 serves as an increasing lens for increasing the size of the images transmitted from the diminishing lens 31. The peripheral portion of the lens 33 is set in a carrier 34. The carrier 34 may be removably threaded in the upper portion of the tube arm 23. The lens 33 is spaced from the lens 31 and is ground or shaped to provide the desired increase in the light image size with a minimum of distortion. It will be observed that the two spaced lenses 31 and 33 provide a dead air space in the tube 20 which acts as an insulator to reduce heat loss through the tube. It may be preferred or found necessary to form the lenses 31 and 33 of a glass that is resistant to temperatures within the ranges that may be present in the oven compartment 10.

The illuminating means 22 is provided to illuminate the interior of the oven compartment 10 so that the foodstuffs cooking therein may be readily visible at the viewing lens 29. The illuminating means 22 may be varied considerably without departing from the broader aspects of the invention. In the form of the invention being described the illuminating means 22 is located at the exterior of the oven compartment 10. The means 22 includes one or more lamps 35. In the arrangement illustrated there are two spaced incandescent lamps 35 arranged in suitable sockets 36. The lamps 35 and their sockets 36 are located at the rear of the back wall 18 and are spaced at opposite sides of the tube arm 23. Light openings 37 are provided in the back wall 18 of the oven compartment 10 at opposite sides of the tube arm 23 and in substantially alignment with the lamps 35. Suitable windows or lenses 38 may close the openings 37 against the loss of heat. The light transmitted through the lenses 38 from the lamps 35 fully illuminates the entire range compartment 10. It will be noted that the light admitting openings 37 are located behind and at the opposite sides of the lens 31 so that the light from them does not strike across the lens 31 and the light admitted by the openings 37 illuminates the rear faces of the articles in the oven compartment 10 in such a manner that practically no shadows are seen in the viewing device.

The lamp sockets 36 may be mounted in any suitable manner. In the particular embodiment of the invention disclosed in the drawing a case or housing 39 encloses the projecting rear portion of the tube 20 and extends downwardly beyond the tube. The sockets 36 are mounted on the lower wall 39ᵃ of the housing 39. An access opening 40 is provided in the housing 39 to render the lamps 35 accessible for replacement, etc. The opening 40 is normally closed by a door 41 provided with a suitable latch or catch 42. The internal surface of the housing 39 may be polished or of such character that it forms an effective reflector for the lamps 35. The lamps 35 are controlled by a suitable switch 43. The switch 43 may be arranged at the forward face of the rail 16 in adjacent relation to the viewing lens 29.

The range embodying the form of the invention just described may be used and operated in the customary manner. When food is being cooked in the oven compartment 10 and it is desired to view the same the switch 43 may be operated to energize the lamps 35 and the interior of the illuminated compartment 10 and the food therein may be readily viewed at the viewing lens 29. A person standing in front of the oven may readily look in the lens 29 and view the foodstuffs being cooked in the oven compartment 10. Light from the lamps 35 passes through the lenses 38 into the oven compartment 10 to illuminate the same. The light or light images from the foodstuffs in the oven compartment 10 are transmitted through the divergent lens 31 and the convergent lens 33 to the reflector 32. The lens 31 is located to be receptive of light images from practically the entire oven compartment 10. Accordingly these images are transmitted to the reflector 32 for direction outwardly through the tube arm 24 and the viewing lens 29.

The condition of the food being cooked in the oven 10 may be easily and quickly ascertained in the manner just described without opening the door B of the oven, and, therefore, without the loss of heat and without disturbing the cooking operation. It is to be particularly noted that a person may view the articles being cooked in the oven 10 without bending or stooping and without being subjected to excessive heat from the open oven door B. When the food has been viewed the switch 43 may be operated to de-energize the lamps 35, or, if desired, the lamps 35 may be left energized throughout the cooking operation.

The viewing means of the invention illustrated in Figs. 1, 2 and 3 of the drawing is embodied in a single compact unit or appliance that may be easily embodied in or applied to the range. The viewing lens 29 through which the oven compartment 10 and the foodstuffs therein are viewed is located at the face of the guard rail 16 where it is conveniently visible and where it does not interfere with any of the cooking operations. The entire oven compartment 10 with its contents is brought into a small or compact field at the viewing lens 29 by the optical system 21 and the lamps 35 assure a complete illumination of the oven compartment 10 so that this image is clear and complete.

Fig. 4 of the drawing illustrates a form of the invention embodied in a cooking range having a hinged cover or top 15ᵃ for the plate warming top 50 of the oven. The cover or top 15ᵃ is hinged at its rear edge and is adapted to be moved between the position illustrated in the full lines and the position illustrated by the broken lines. The oven structure, the guard rail 16 and the other parts of the range may be the same as described above and bear corresponding reference numerals.

The viewing device or means of the present invention illustrated in Fig. 4 may be said to comprise, generally, a body 51 for conducting light from the oven compartment 10 to the exterior of the range, an optical system 52 in the body 51, and illuminating means 53 for illuminating the oven compartment 10.

The body 51 is a housing or box-like structure for containing the optical system 52 and for conducting the light from the illuminated oven compartment 10 to the exterior of the range. The body 51 may be formed of sheet metal or the like, and its visible portions may be finished to harmonize with the other parts of the range construction. In accordance with this form of the invention the body 51 is arranged or seated in an opening 54 in the range. The opening 54 is at the joinder of the upper and rear walls 17 and 18 of the oven. The opening 54 extends some distance forwardly in the wall 17 and some distance downwardly in the wall 18. An opening 55 is formed in the guard rail 16 above or in communication with the opening 54. The body 51 fills or occupies the openings 54 and 55 and projects upwardly from the top 50 and downwardly and inwardly into the oven compartment 10. The hinged cover 15ᵃ is provided with an opening 56 for passing or receiving the projecting upper portion of the body 51. In this connection it is to be observed that the body 51 is located adjacent the hinged rear edge of the cover 15ᵃ so that the opening 56 may be small in size. The upper forward corner of the body 51 is bevelled or inclined downwardly and forwardly and the lower forward corner of the body 51 is inclined downwardly and rearwardly.

A tube 57 is arranged in the body 51 and extends upwardly and rearwardly from the inclined lower forward corner of the body 51. The tube 57 may be suitably fixed in the body 51 and may project forwardly from the body, as illustrated. A similar tube 58 is provided in the body 51 and extends downwardly and rearwardly from its inclined upper forward corner. The upper end of the tube 58 is open for the transmission of light and may be provided with a viewing lens 60 similar to the lens 29 described above. The tubes 57 and 58 are disposed at substantially equal angles to the vertical.

The optical system 52 is provided to transmit light images from the oven compartment 10 outwardly through the body 51 and its tubes 57 and 58 to the viewing lens 60. The optical system 52 includes a concave lens 61 arranged in the tube 57. The lens 61 is similar to the above described lens 31 and is preferably removably arranged in the lower end portion of the tube 57. The lens 61 is positioned and formed to be receptive to and to pass light from practically all parts of the oven compartment 10. The lens 61 closes the tube 57 to aid in preventing an excessive loss of heat through the viewing device. The optical system 52 further includes a reflector 62 in the body 51. The reflector 62 is arranged in spaced relation to the open adjacent rear ends of the tubes 57 and 58 and is in a substantially vertical plane. The reflector 62 is adapted to receive the light transmitted by the lens 61 and reflect it outwardly through the tube 58 and the viewing lens 60. The reflector 62 may be formed of polished or plated metal or of glass.

It may be preferred to adjustably mount the reflector 62 in the body 51 so that the viewing means may be adjusted to be suited for use by persons of different heights. As illustrated in the drawing a bracket 63 is provided on the back wall of the body 51 and a pivot pin 64 secures the reflector 62 to the bracket 63. The reflector 62 is supported for pivotal adjustment about a substantially horizontal axis. A screw 65 is threaded through an opening in the rear wall of the body 51 and bears against the rear side of the reflector 62 adjacent the upper end of the reflector. A leaf spring 66 is attached to the body 51 or the bracket 63 and bears forwardly against the rear side of the reflector 62 adjacent to its lower end. The screw 65 is adapted to pivot or adjust the reflector 62 in one direction and the spring 66 constantly urges the reflector in the other direction. By suitably adjusting the screw 65 the reflector 62 may be set at any selected or required angle to provide for the desired direction of the reflected images from the oven compartment 10.

The illuminating means 53 is provided to illuminate the oven compartment 10 and the articles therein. In the form of the invention being described, the illuminating means 53 is embodied in the range construction and may be said to be within the oven compartment 10. The means 53 includes a light reflecting fixture 67 mounted in the upper wall 17 of the oven compartment 10. The fixture 67 opens or faces downwardly and carries a lamp socket 68. A suitable lens 69 extends across the mouth or open lower side of the fixture 67. An electric incandescent lamp 70 is provided in the socket 68. The lamp 70 may be controlled by a suitably located switch similar to the above described switch 43. The fixture 67 is preferably formed and located so that the lamp 70 is adapted to fully illuminate the entire oven compartment 10.

It is believed that the operation or use of the viewing device illustrated in Fig. 4 of the drawing will be understood from the foregoing detailed description. When it is desired to examine or view food being cooked in the oven compartment 10 the lamp 70 may be energized to illuminate the interior of the compartment 10 and the cook may view the cooking food by looking in the lens 60. Light from the oven compartment 10 and the objects therein is transmitted by the lens 61 and is reflected by the reflector 62 to pass through the lens 60. The diverging lens 61 is such that substantially the entire oven compartment and its contents may be viewed at the lens 60. It is to be observed that the hinged cover or top 15ª does not in any way interfere with the use or operation of the viewing means. When the top 15ª is in the raised position illustrated in full lines it is clear of the viewing lens 60 and when the top is in the lowered position illustrated by the broken lines it is below and clear of the lens 60. The viewing means is arranged and located so that it does not in any way interfere with the usual or desired use of the range. The viewing means is small and compact and may be inexpensively applied to or embodied in the cooking range.

Having described only typical preferred forms and applications of my invention, I do not wish to be limited or restricted to the specific forms and applications herein set forth, but wish to reserve to myself any variations or modifications that may appear to those skilled in the art or fall within the scope of the following claims.

Having described my invention, I claim:

1. In a cooking range of the console type having an oven compartment and an upwardly projecting guard rail, the improvement which comprises a tubular member having an inner end positioned at the upper portion of and opening into the oven compartment and its outer end extending through and terminating at the front of the guard rail, and an optical system associated with the member for directing light images from the compartment through the member and through the guard rail, whereby the compartment and objects therein may be viewed from a position in front of and above the range.

2. In a cooking range of the console type having an oven compartment and an upwardly projecting guard rail, the improvement which comprises a tubular member having an inner end positioned at the upper portion of and opening into the oven compartment and its outer end extending through and terminating at the front of the guard rail, and an optical system associated with the member for directing light images from the compartment through the member and through the guard rail, whereby the compartment and objects therein may be viewed from a position in front of and above the range, the optical system including a diminishing lens receiving the light rays from the oven compartment.

3. In a cooking range of the console type having an oven compartment and an upwardly projecting guard rail, the improvement which comprises a tubular member having an inner end positioned at the upper portion of and opening into the oven compartment and its outer end extending through and terminating at the front of the guard rail, and an optical system associated with the member for directing light images from the compartment through the member and through the guard rail, whereby the compartment and objects therein may be viewed from a position in front of and above the range, the optical system including a concave lens receiving the light images from the oven compartment, and a reflector receiving said images from the lens and directing them through the outer end portion of the tubular member.

4. In a cooking range of the console type having an oven compartment and an upwardly projecting guard rail, the improvement which comprises a tubular member having an inner end positioned at the upper portion of and opening into the oven compartment and its outer end extending through and terminating at the front of the guard rail, and an optical system associated with the member for directing light images from the compartment through the member and through the guard rail, whereby the compartment and objects therein may be viewed from a position in front of and above the range, the optical system comprising a concave lens arranged at the inner portion of the tubular member, a reflector arranged in the medial portion of the tubular member, and a convex lens arranged in the tubular member between the concave lens and the reflector.

5. In a cooking range of the console type having an oven compartment and an upwardly projecting guard rail, the improvement which comprises a tubular member having a downwardly and forwardly inclined arm positioned at the rear upper portion of the oven compartment and opening into said compartment, the tubular member having a second arm inclined upwardly and forwardly from the upper end of the first-mentioned arm and extending through and terminating at the front of the guard rail, and an optical system associated with said member for directing light images from the oven compartment through the member and through the guard rail whereby the compartment and objects therein may be viewed from a position in front of and above the range, the optical system including a diminishing lens in said first mentioned arm transmitting a reduced image of the compartment, and a reflector in the member at the juncture of the arms reflecting the reduced image upwardly and forwardly through said second arm of the member.

6. In a cooking range having a heating compartment, the improvement which comprises a tubular member having an inner end positioned at the upper portion of, and exposed to, the compartment and its outer end extending through, and terminating adjacent, the back portion of and above said range, and an optical system associated with the member for directing light images from the compartment through the member whereby the interior of the compartment and objects therein, may be viewed from a position in front of, and above, the range.

7. In a cooking range having a heating compartment, the improvement which comprises a means forming a passageway having an inner end positioned at the upper portion of, and exposed to, the compartment, and an outer end terminating adjacent the back portion and above said range, and an optical system associated with said means for directing light images from the compartment through the passageway whereby the compartment and objects therein may be viewed from a position in front of and above the range.

ALFRED S. VINCENT.